United States Patent [19]

Dunlop

[11] 3,856,175
[45] Dec. 24, 1974

[54] MOLDED RUBBER PRODUCTS AND RELATED COMPOSITIONS

[75] Inventor: William R. Dunlop, Buffalo Grove, Ill.

[73] Assignee: The Richardson Company, Des Plains, Ill.

[22] Filed: June 27, 1972

[21] Appl. No.: 266,806

Related U.S. Application Data

[63] Continuation-in-part of Ser. No. 5,891, Jan. 26, 1970, abandoned.

[52] U.S. Cl............ 220/22, 136/166, 260/33.6 AQ, 260/42.32, 260/42.47, 260/892, 260/42.25
[51] Int. Cl....... B65d 1/26, B65d 85/00, C08d 9/08
[58] Field of Search..... 260/33.6 AQ, 892; 136/166; 220/22

[56] References Cited
UNITED STATES PATENTS

| | | | |
|---|---|---|---|
| 2,809,175 | 10/1957 | Sell | 260/892 |
| 3,093,515 | 6/1963 | Rector | 136/166 |
| 3,359,229 | 12/1967 | Chalex et al. | 136/166 |

*Primary Examiner*—Allan Lieberman
*Attorney, Agent, or Firm*—John L. Hutchinson; Alan M. Abrams

[57] ABSTRACT

Thin-wall molded electric storage battery boxes with wall thicknesses not in excess of 0.200 inches are molded from rubber compositions characterized by less than 20 weight percent styrene-butadiene copolymer rubber, a high filler content, a low sulfur content within the range of about 4 to 12 weight percent of sulfur based on the rubber, a processing oil, and a styrene-butadiene copolymer resin in a range of from about 2 to about 8 weight percent based on the total composition. The composition when molded into products with wall thicknesses of about 0.100 inches provides a useful combination of tensile, elongation, stiffness, hardness, and particularly high impact resistance at low temperatures.

10 Claims, 1 Drawing Figure

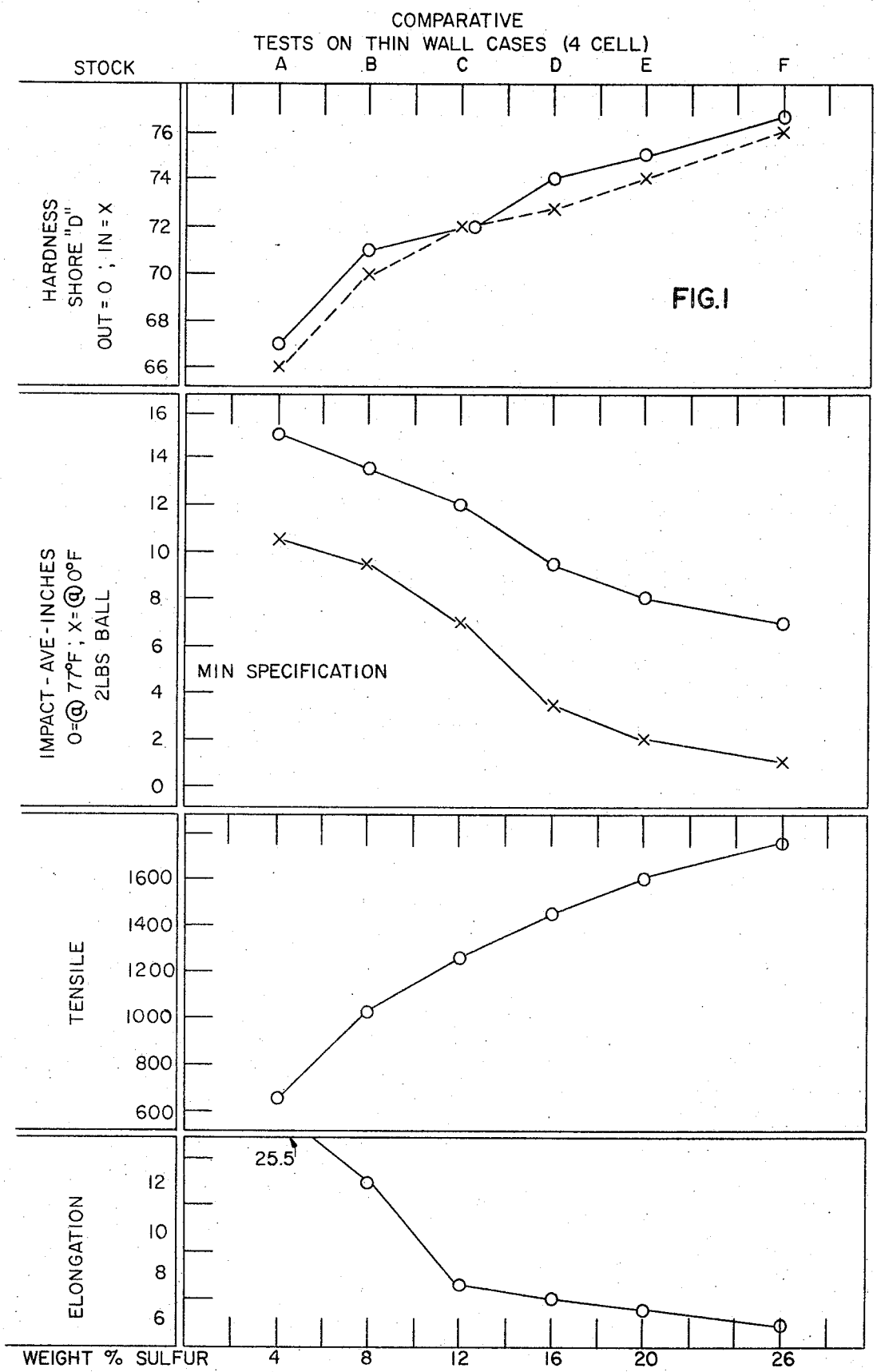

MOLDED RUBBER PRODUCTS AND RELATED COMPOSITIONS

CROSS REFERENCE TO RELATED APPLICATION

This application is a Continuation-In-Part of co-pending application Ser. No. 5,891 filed Jan. 26, 1970, now abandoned.

BACKGROUND OF THE INVENTION

This invention relates to molded rubber products and more particularly to thin-wall containers with one or more inner compartments and to rubber compositions for molding these containers.

Containers with one or more inner compartments represent one of the more important areas of use for molded rubber products. Commercially, these containers have been used as electric storage battery boxes, beverage carriers and the like.

In many instances, the containers are characterized by multi-compartments wherein each compartment is several times in depth and other dimensions the thickness of the adjoining members of the container. In respect to electric storage battery boxes, the compartments commonly measure about 7 inches deep, 6 inches long and 1 ½ inches wide with the adjoining outer wall measuring about ¼ inch in thickness.

In use, the electric storage battery boxes are subjected to a variety of destructive forces including those caused by the heavy weight of the lead plates and acid as well as by vibrational and impact factors. Since the thicknesses of the walls and partitions are relatively thin, it is important that they have sufficient properties of strength, impact resistance, hardness, stiffness and the like in order to hold the contents and withstand the various destructive forces. Further, because the storage batteries are usually employed with motor vehicles, they must be able to withstand extreme temperature variations and particularly maintain their physical properties such as impact resistance at low temperatures at or below 0° F.

In the past, rubber compositions useful for molding the electric storage battery boxes have been characterized as vulcanizable compositions containing rubber as a binder, large amounts (in excess of 50 weight percent) of a finely divided filler, processing oils, selected activators and accelerators, mold release agents, and sulfur usually in amounts above about 15 or 16 weight percent. These compositions when cured at temperatures of about 350° F. have provided containers with satisfactory properties for use as electric storage battery boxes.

Recently, emphasis has been made of electric storage battery boxes with significantly thinner wall and partition sections which provide larger compartments for the lead plates and acid. Initially, the primary composition for these new thin-wall battery boxes was plastic as illustrated by U.S. Pat. No. 3,888,007. However, since rubber compositions provide several advantages associated with cured products and cost less than the plastic composition, there has been a need for producing thin-wall boxes from rubber compositions.

When the previous rubber compositions were used, however, for molding these newer thin-wall containers, I found that the properties of the cured product were not usually satisfactory, and particularly the impact resistance at low temperatures. Generally, also, when the necessary hardness, tensile strength, and stiffness were achieved, a lower value of impact resistance resulted. On the other hand, when the impact resistance was satisfactory, the other properties were not. Therefore, new compositions were needed to provide the desired combination of the requisite properties.

SUMMARY

Briefly, my invention is directed to the production of thin-wall containers with one or more inner compartments and to rubber compositions for molding the containers. The rubber compositions are characterized by rubber, a major amount of finely divided filler, a processing oil, an activator, and a reduced amount of sulfur below 15 16 weight percent, plus a vinyl aromatic or acrylonitrile resin and particularly a styrene-butadiene copolymer within a specific weight proportion and having a specific softening temperature range. With the use of compositions of this type and particularly those prepared with non-aromatic processing oils, I have molded thin-wall containers with wall thicknesses of about 0.100 inch, which exhibit an excellent combination of the desired requisite properties and especially high impact resistance at both elevated and low temperatures.

DESCRIPTION OF THE DRAWINGS

FIG. 1 is a graphical presentation of the data of Example III comparing the physical properties of the molded compositions of this invention containing less than 12 weight percent sulfur, with the compositions of the prior art containing sulfur above 16 weight percent.

DETAILED DESCRIPTION

Thin-wall, electric storage battery boxes are multi-compartment containers with wall and partition thicknesses not in excess of about 0.200 inch. Frequently, these boxes have compartments wherein the depth of each is greater than its width and several times the maximum wall or partition thickness. Illustrative dimensions are 7 inches deep, 1½ inches wide, 6 inches long, and a maximum wall thickness not in excess of about 0.190 inches.

The rubber compositions useful in molding these containers are vulcanizable compositions comprising about 6–20 weight percent of a styrene-butadiene copolymer rubber, at least about 50 weight percent of a finely divided inert filler, and based on the rubber, about 30–70 weight percent of a processing oil, about 40–160 weight percent of an activator, not more than about 12 weight percent of sulfur and a styrene-butadiene copolymer resin within the range of from about 2 to about 8 weight percent of the total composition. Such composition when cured possesses an elongation, a tensile strength at least above about 670 pounds per square inch, and a stiffness characteristic of a semi-hard to hard rubber cure with improved impact resistance and particularly at low temperatures.

As described above, the rubber copolymer is present in the composition in amounts of about 6–20 weight percent and more advantageously about 8–15 weight percent. While typical rubbers may be used including natural rubber, SBR (styrene-butadiene rubber), polybutadiene rubber, EPDM (ethylene-propylene dimer), NBR (nitrile-butadiene rubber), which are capable of being vulcanized with sulfur, the highly preferred rubber copolymer is a styrene-butadiene copolymer especially with a low styrene content in the order of about 5–30 percent. This preferred rubber copolymer is advantageously present in an amount equal to about 8 to 12 or about 10 weight percent of the total composition.

The composition also includes a high content of filler usually at least about 50 weight percent and normally about 50–80 weight percent. Typical fillers are finely divided inert compounds which are advantageously absorbent with respect to oil such as coal dust, talc and hard rubber dust. Preferably, the filler is coal dust of a particle size below about 80 microns and present in an amount equal to about 60–80 weight percent of the composition.

A further component is a processing oil which is generally present in compositions of this invention in an amount based on the rubber of about 30–70 weight percent and more advantageously about 30–50 weight percent. Typical oils include aromatic and non-aromatic oils with viscosities of about 40–180 (SUS at 210° F.) which are further described in an article "Oil Extended Rubbers" by E. B. Story in RUBBER CHEMISTRY AND TECHNOLOGY, December 1961, vol. 34, No. 5, Pages 1,402–1,421.

Advantageously, the oil is a non-aromatic oil with a high degree of saturation as measured by acidaffin content and a small amount of nitrogen bases. More advantageously, the oil contains a minimum of about 75 weight percent of components with saturation at least equivalent to second acidaffins which generally includes saturates, second acidaffins, and mixtures thereof; and a maximum of about 8 weight percent nitrogen bases and about 17 weight percent first acidaffins as determined by Rostler-Sternberg analysis. In addition, the oils preferably have essentially no asphaltenes or a maximum of about 0.5 weight percent.

Other than sulfur and the resin modifier, the other components include activators, accelerators and mold release agents known to the art. The major component of these is the activator which usually is present in an amount based on rubber of about 40–160 weight percent and more advantageously about 40–100 weight percent. Typical activators include alkaline earth compounds such as the hydroxide or carbonate of calcium or barium, and the like. Preferably in this invention, the activator is lime.

The compositions of this invention utilize a very low level of sulfur below about 15 to 16 and more preferably below about 12 weight percent based on the rubber and advantageously within about 4 to about 12 percent. These low amounts of sulfur within about 4 to 12 weight percent when combined with the resin modifier according to this invention provide a particularly advantageous combination of physical properties for the molded composition and especially desirable properties such as impact resistance at low temperatures.

The resin modifier used according to this invention in combination with the low level of sulfur can be a vinyl aromatic or acrylonitrile resin with a softening point of about 150°–250°F. For example, aromatic resins which may be used include those based on styrene, or vinyl toluene with at least about 65 percent of the units being derived from the aromatic and advantageously about 65–95 percent. However, the preferred resin, particularly when employed with a low sulfur content of from 4 or 8 to 12 weight percent is a copolymer of styrene and butadiene with such copolymer containing from about 70–90 percent styrene. With a softening point of about 150°–250° F. for such copolymer, the resin can readily be incorporated into the molding composition during processing at such temperatures and thoroughly distributed throughout the composition to form a homogeneous mixture. The resin is present in an amount sufficient to provide in the composition upon curing an elongation and stiffness and a tensile strength of at least above about 670 pounds per square inch characteristic of a hard rubber cure with a high impact resistance of at least above about 3 inches at 0° F. For this purpose the resin is present within the range of from about 2 to 8 and more preferably 6 to 8 weight percent of the total composition.

In forming the compositions of this invention, the various components are compounded and mixed in predetermined sequence and then subjected to mixing on a mill or Banbury, and the process of U.S. Pat. No. 2,844,327 is illustrative of such procedure. Typically, the temperature for the processing is in the order of 150°–250° F. Thereafter, the compositions are molded in closed, heated molds to form the containers into the desired shape and simultaneously vulcanize the compositions to a hard permanent state.

The resultant container exhibits a tensile strength representative of a hard rubber cure at least above 670 and usually above about 800 pounds per square inch, an elongation less than about 30 percent, and a stiffness of at least about 2/inches in combination with impacts of at least about 20 inches (with a 2 lb. ball) at room temperature (about 75° F.), and at least above about 3 and usually above about 7 inches at 0° F., as measured on a wall thickness of about 0.100 inches. These performance values are also based on a rubber composition with a Mooney viscosity of about 100 and a hardness in the molded product of about 60–70 (Shore-D).

The following examples illustrate some of the embodiments of this invention and offer comparison with representative samples of the prior art compositions. It is to be understood that these are for illustrative purposes only and do not purport to be wholly definitive to conditions or scope of this invention.

EXAMPLES I–II

Compositions were prepared by mixing the components in Table I in a Banbury with the temperature varying from ambient to about 250° F. during the 4-5 minues of mixing time. The components were added in the following sequence: rubber, activator (and accelerators and mold release agents), oil, filler, and resin. The aromatic oil was Dutrex 1786 (Shell Oil Company) and the non-aromatic oil was S-293 (Shell Oil Company).

Table I

|  | Parts/100 Parts | |
| --- | --- | --- |
|  | Example I | Example II |
| Rubber (SBR-23% Styrene) | 10.00 | 10.00 |
| Styrene-Butadiene Resin (85% Styrene) | 8.00 | 8.00 |
| Lime | 8.00 | 8.00 |
| Sulflur | 0.61 | 0.61 |
| Oil (Aromatic) | 3.50 | — |
| Oil (Non-Aromatic) | — | 3.50 |
| Acelerators & Mold Release Agents | 0.69 | 0.69 |
| Coal Dust | 69.20 | 69.20 |
|  | 100.00 | 100.00 |
| Mooney Viscosity, MS, at 275°F. | 106 | 100 |

Test samples as representative of side walls of battery boxes were molded from the rubber compositions. These were about 0.100 inch thick. Test results for tensile, elongation, stiffness, hardness and impact resistance were measured on samples cured for 5 minutes at 360° F. and are reported in Table II below together with comparison values for samples from conventional compositions (A) based on the aromatic oil. In addition, values are reported for the composition of Example II without the resin (B). The results for stiffness are reported as the reciprocal of the inches of movement of a sample (3 in. x 1 in. x 0.100 in.) with a 2 inch span and a 5 lb. load at the center point. The impact resistance is reported as inches of height that a 2 lb. ball falls before damage is observed in the sample. The test method is described in ASTM D639-62.

Table II

|  | Example I | Example II | Composition A | Composition B |
|---|---|---|---|---|
| Tensile (psi) | 1130 | 1070 | 1100 | 950 |
| Elongation (%) | 9.9 | 17.8 | 4.4 | 15.4 |
| Stiffness (1/inches) | 4.6 | 3.1 | 2.3 | 1.6 |
| Hardness (Shore-D) | 71 | 70 | 70 | 67 |
| Impact (inches)- |  |  |  |  |
| Room Temperature | 29 | 29 | 15 | 29 |
| 0° F. | 3 | 10 | 1 | 26 |

The above results demonstrate the performance level of the combination of properties from compositions which include the styrene-butadiene copolymer resin in combination with low sulfur content and the improvement resulting from the combination of the resin and a non-aromatic oil.

EXAMPLE III

Comparative tests were performed as follows to demonstrate the difference in physical properties between the composition of this invention having a low sulfur content in combination with a styrene-butadiene resin, and representative compositions of the prior art such as those of U.S. Pat. No. 2,809,175, H. S. Sell, having high sulfur content.

The following specific compositions (A to F) were prepared on a standard laboratory Banbury mixer:

| STOCK | A | B | C | D | E | F |
|---|---|---|---|---|---|---|
| % Sulfur/100RHC | 4.0 | 8.0 | 12.0 | 16.0 | 20.0 | 26.0 |
| *SBR | 331 | do. | do. | do. | do. | do. |
| Coal dust | 620 | do. | do. | do. | do. | do. |
| **Processing Oil | 142 | do. | do. | do. | do. | do. |
| Lime - Ca(OH)$_2$ | 265 | do. | do. | do. | do. | do. |
| Sulfur (Rubber makers grade) | 13.2 | 26.5 | 40.0 | 53.0 | 66.0 | 86.0 |
| ***Wax | 8 | do. | do. | do. | do. | do. |
| ¹Slip Agent | 8 | do. | do. | do. | do. | do. |
| ²Accelerator | 7 | do. | do. | do. | do. | do. |
| ³Resin | 200 | do. | do. | do. | do. | do. |
| Coal dust | 620 | do. | do. | do. | do. | do. |
| Coal dust | 1101 | 1088 | 1074 | 1061 | 1048 | 1028 |
| TOTAL | 3315.2 | 3315.5 | 3315.0 |  |  |  |

*SBR-1509 is a standard emulsion, cold process styrene-butadiene copolymer with 23.5% of bound styrene and Mooney viscosity of 30-35.
**Shellflex 1371 by Shell Oil; a highly saturated naphthenic oil with the following properties:

```
SUS Viscosity at 100° F - 300 - 2000
SUS Viscosity at 210° F -  25 - 100
Flash point °F - 350-500°F
Clay-Gel Analysis:      Modified Method
Polar Compounds        0-4%
Aromatics I            5-15
Aromatics II           20-45
Saturates              45-80
```
***City Service "650 Crude"; microcrystalline wax with 6 to 16% oily constituents.

¹Armoslip BR" (Armour Industrial Chemical Co.): an aliphatic primary amine of 8 to 16 carbon atoms.
²Richardson CP09 (The Richardson Co. - Chemical Div.): Condensation product of butyraldehyde and anilen with dihydropyridine as the active component.
³S6F HiStyrene Resin by Goodyear Tire and Rubber Co., a copolymer of styrene and butadiene with 82.5% bound styrene and 17.5% butadiene.
The coal dust is semi-anthracite coal having an average particle size of 20 microns and an ash content of approximately 11-13% mined and ground in Pennsylvania.

The above compositions A to F were each prepared by a conventional method of incorporating all the above-listed ingredients into a standard laboratory Banbury mixer except for the final quantity of coal dust. The ingredients were mixed for 1 minute and the final quantity of coal dust was then added to the composition and further mixed and blended until a stock temperature of 260° F. was reached.

The compositions (A to F) were then each used to fabricate 4-cell compartmentalized battery containers by compression molding with walls having thicknesses of less than 0.20 inch, and more particularly, in the range of about 0.125 inch. The containers were cured at about 360° F. for the following time periods:

| | A | B | C | D | E | F |
|---|---|---|---|---|---|---|
| Minutes | 4.0 | 4.0 | 4.5 | 5.0 | 5.5 | 5.5 |

Thereafter the following tests were conducted on such battery containers according to ASTM D639-62 (1970) — Battery Containers:

I. Hardness, using a Shore "D" Durometer, initial readings.
II. Impact, using the "Free-Falling Weight Method" on the molded cases. A 2 pound ball is used, placed one/half way down from the top with the ball to first surface crack at 1 inch increments. Values are either in inches with a 2 lb. ball or can be converted to inch lbs.
III. Tensile strength,
IV. Elongation, and
V. Bulge.

The data obtained from the comparative tests is reported in Table III and presented graphically in FIG. 1.

Table III

|  | A | B | Stock C | D | E | F |
|---|---|---|---|---|---|---|
| HARDNESS | | | | | | |
| Out. | 67 | 71 | 72 | 74 | 75 | 76 |
| In. | 66 | 70 | 72 | 73 | 74 | 76 |
| IMPACT | | | | | | |
| at 77°F | 14–16 | 12–15 | 10–14 | 9–10 | 8–9 | 7–8 |
| average | 15.0 | 13.7 | 12.0 | 9.5 | 8.2 | 7.2 |
| at 0°F | 9–12 | 8–11 | 7–8 | 3–4 | 2–2 | 1–2 |
| average | 10.5 | 9.5 | 7.2 | 3.5 | 2.0 | 1.2 |
| TENSILE | 670 | 1040 | 1270 | 1460 | 1590 | 1730 |
| ELONGATION | 25.5 | 12.3 | 7.7 | 6.9 | 6.7 | 5.8 |
| BULGE (MM) | | | | | | |
| at 210°F | 21.0 | 17.0 | 11.4 | 10.0 | 9.4 | 8.2 |

Based upon the comparative data of Table III and the graph of FIG. 1 representing the successive changes in values, the following conclusions were drawn:

Hardness increases consistantly after an initial rapid rise from 4 to 8 percent sulfur.

Impact resistance at 77° F. was at an acceptable level for all ranges of sulfur, however, when at the critical temperature of 0° F. the impact resistance dropped off sharply when the sulfur content was increased from 16 to 26 percent (Sell U.S. Pat. No. 2,809,175), whereas a sulfur content of 4 to 12 percent (present invention) provided impact resistance well within an acceptable range, namely 5 in. with a 2 lb. ball, or 10 in.-lbs.

Tensile strength increased notably when the sulfur content was 8 percent and above, while the elongation dropped down above 8 percent sulfur then decreased gradually as the sulfur was raised.

Bulge resistance was not improved significantly when the sulfur content was increased above 12 percent (per 100 RHC).

Based upon the above data, it is concluded that containers prepared from compositions havng a sulfur content of more than 12 percent (Stocks D to E, Sell Patent) although having adequate hardness, tensile and elongation characteristics, would not be satisfactory for use in thin-wall containers because of their inferior impact properties at sub-freezing temperatures. In contradistinction, thin-walled containers fabricated from compositions of the present invention having 4 to 12 percent sulfur (Stocks A to C), also fell within specified acceptable ranges for hardness, tensile strength and elongation. However, in addition, they showed, most critically, superior impact strength at sub-freezing temperatures.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

I claim:

1. A vulcanizable composition comprising about 6–20 weight percent of a styrene-butadiene copolymer rubber containing 5–30 weight percent styrene, about 50–80 weight percent of a finely divided inert filler having a particle size below about 80 microns selected from the group consisting of coal, talc and hard rubber dust and from about 2 to about 8 weight percent of a resin of a styrene-butadiene copolymer containing about 70–90 weight percent styrene and having a softening temperature of about 150°–250°F to provide in the composition when cured a tensile strength of at least about 670 psi at room temperature and an impact resistance of at least about 3 inches (with a 2 lb. ball) at 0°F. and based on the rubber about 30–70 weight percent of a processing oil having viscosity of about 40–180 SUS at 210°F, about 40–100 weight percent of an activator selected from alkaline earth hydroxides or carbonates and about 4–12 weight percent sulfur.

2. The composition of claim 1 wherein the resin is at least from about 6 to about 8 weight percent of the composition.

3. The composition of claim 2 wherein the resin is a styrene-butadiene copolymer with at least 70 percent of its units based on styrene and the processing oil is a non-aromatic oil with a high degree of saturation as measured by acidaffin content.

4. The composition of claim 3 wherein the processing oil has a miniumum of about 75 weight percent of components with saturation at least equivalent to second acidaffins and a maximum of about 8 weight percent nitrogen base components and 17 weight percent first acidaffins.

5. The composition of claim 1 wherein the weights of the components are in the order of about 8–15 percent for rubber, about 50–80 percent for filler which is coal dust, about 30–70 percent for processing oil which is non-aromatic with a high degree of saturation as measured by acidaffin content, about 40–100 percent for lime as activator, about 4–12 percent for sulfur, and about 2–8 percent for resin which is a styrene-butadiene copolymer with about 70–90 percent of its units as styrene.

6. A thin-wall container with one or more inner compartments and having walls and partitions of uniform thicknesses not in excess of 0.200 in., the container being of a vulcanized rubber composition wherein the composition before vulcanization, comprises about 6–20 weight percent of a styrene-butadiene copolymer rubber containing 5–30 weight percent styrene, about 50–80 weight percent of a finely divided inert filler having a particle size below about 80 microns selected from the group consisting of coal, talc and hard rubber dust and from about 2 to about 8 weight percent of a resin of butadiene styrene copolymer containing about 70–90 weight percent styrene and having a softening temperature of about 150°–250°F to provide in the composition when cured a tensile strength of at least 670 psi at room temperature and an impact resistance of at least about 3 inches (with a 2 lb. ball) at 0°F and based upon the rubber, about 30–70 weight percent of a processing oil having a viscosity of about 40–180 SUS at 210°F, about 40–100 weight percent of an activator selected from alkaline earth hydroxides or carbonates and about 4–12 weight percent sulfur.

7. The container of claim 6 wherein the weights of the components in the uncured composition are in the order of about 8–15 percent for rubber, about 50–80 percent for filler which is coal dust, about 30–70 percent for processing oil which is non-aromatic with a high degree of saturation as measured by acidaffin content, about 40–100 percent for lime as activator, about 4–12 percent for sulfur, and about 6 to about 8 percent for resin which is a styrene-butadiene copolymer with about 70–90 percent of its units as styrene.

8. The container of claim 7 wherein the saturated processing oil is further characterized as having a minimum of about 75 weight percent of components with saturation at least equivalent to seconds acidaffins and a maximum of about 8 weight percent nitrogen base components and 17 weight percent first acidaffins; and the activator is lime.

9. The container of claim 8 wherein the activator is lime, and the styrene-butadiene copolymer has about 80–90 percent of its units as styrene.

10. The container of claim 9 wherein the rubber is a low styrene, butadiene rubber present in an amount of about 8–15 weight percent, the filler is coal dust in an amount of about 60–80 weight percent, and based on rubber, the processing oil is about 30–50 weight percent, the activator is about 60–100 weight percent, the sulfur is about 4–12 weight percent, and the resin is about 6 to about 8 weight percent.

* * * * *

UNITED STATES PATENT OFFICE
CERTIFICATE OF CORRECTION

Patent No. 3,856,175          Dated December 24, 1975

Inventor(s) William R. Dunlop

It is certified that error appears in the above-identified patent and that said Letters Patent are hereby corrected as shown below:

Column 1, line 58 - "U.S. Pat. No. 3,888,007" should read "U.S. Pat. No. 3,388,007".

Column 10, line 3 - "seconds" should read "second".

Signed and sealed this 8th day of April 1975.

(SEAL)
Attest:

RUTH C. MASON
Attesting Officer

C. MARSHALL DANN
Commissioner of Patents
and Trademarks